United States Patent [19]

Schäfer et al.

[11] Patent Number: 4,499,038
[45] Date of Patent: Feb. 12, 1985

[54] PROCESS FOR THE PRODUCTION OF MICROCELLULAR MOLDINGS FROM DIISOCYANATE AND COMPOUNDS CONTAINING GROUPS OBTAINED BY REACTING AMINO GROUPS WITH CARBON DIOXIDE

[75] Inventors: Walter Schäfer, Cologne; Hans-Joachim Meiners, Leverkusen; Klaus Seel, Cologne; Wolfgang Reichmann, Hilden; Kuno Wagner, Leverkusen; Kurt Findeisen, Odenthal, all of Fed. Rep. of Germany

[73] Assignee: Bayer Aktiengesellschaft, Leverkusen, Fed. Rep. of Germany

[21] Appl. No.: 549,040

[22] Filed: Nov. 7, 1983

[30] Foreign Application Priority Data

Nov. 20, 1982 [DE] Fed. Rep. of Germany ....... 3242925

[51] Int. Cl.$^3$ .............................................. C08G 18/14
[52] U.S. Cl. ...................................... 264/51; 252/182; 521/51; 521/163; 521/164; 521/167
[58] Field of Search .................. 521/51, 163, 164, 167; 264/51; 252/182

[56] References Cited

U.S. PATENT DOCUMENTS

| | | | |
|---|---|---|---|
| 3,635,908 | 1/1972 | Vogt et al. | 260/77.5 AA |
| 3,726,952 | 4/1973 | Boden et al. | 264/48 |
| 3,925,527 | 12/1975 | Kleimann et al. | 264/53 |
| 3,993,606 | 11/1976 | Von Bonin et al. | 260/2.5 AH |
| 4,024,090 | 5/1977 | Von Bonin et al. | 260/2.5 AH |
| 4,033,912 | 7/1977 | Kleimann et al. | 260/2.5 AH |
| 4,058,492 | 11/1977 | Von Bonin et al. | 260/2.5 AM |
| 4,076,695 | 2/1978 | Keil | 260/77.5 AM |
| 4,098,731 | 7/1978 | Von Bonin et al. | 521/51 |
| 4,201,847 | 5/1980 | Kleimann et al. | 521/172 |
| 4,218,543 | 8/1980 | Weber et al. | 521/51 |

FOREIGN PATENT DOCUMENTS

| | | |
|---|---|---|
| 1570571 | 7/1969 | Fed. Rep. of Germany . |
| 2200480 | 7/1972 | Fed. Rep. of Germany . |
| 969114 | 9/1964 | United Kingdom . |
| 1339356 | 12/1973 | United Kingdom . |
| 1365215 | 8/1974 | United Kingdom . |

Primary Examiner—Maurice J. Welsh
Attorney, Agent, or Firm—Gene Harsh; Joseph C. Gil

[57] ABSTRACT

The present invention is directed to a process for the production of polyurea-based microcellular moldings comprising reacting (a) at least one diisocyanate or polyisocyanate containing only aromatically bound isocyanate groups,
(b) at least one compound containing at least two isocyanate-reactive groups, and
(c) optionally the auxiliaries and additives known in polyurethane chemistry, in closed molds, components (a)–(c) being processed as a one-shot system by reaction injection molding, characterized in that component (b) comprises at least one polyether compound (b1) optionally in admixture with other isocyanate-reactive compounds and containing at least 3 aliphatically bonded ether groups and n-aliphatically bonded isocyanate-reactive groups, n standing for an integer or, statistically a fraction of from 2–4

(i) at least (100:n) % of the isocyanate-reactive groups present in component (b1) being aliphatically bonded primary and/or secondary amino groups,
(ii) at least 10 equivalent % of said amino groups being present in the form of ammonium carbamate groups having a functionality of two in the isocyanate addition reaction, of the type obtained by reacting aliphatically bonded, primary or secondary amino groups with carbon dioxide,
(iii) the unmodified compounds containing at least 3 ether groups having a molecular weight of from 200 to 10,000 and
(iv) at least 0,2 equivalent % of all isocyanate-reactive groups of the total component (b) being ammonium carbamate groups.

The present invention also relates to said compounds (b) optionally in admixture with the auxiliaries and additives known in polyurethane chemistry.

9 Claims, No Drawings

PROCESS FOR THE PRODUCTION OF MICROCELLULAR MOLDINGS FROM DIISOCYANATE AND COMPOUNDS CONTAINING GROUPS OBTAINED BY REACTING AMINO GROUPS WITH CARBON DIOXIDE

This invention relates to an improved process for the production of microcellular or foamed moldings using the reaction injection molding technique, the reaction mixture to be introduced into closed molds and being based on organic polyisocyanates and compounds containing isocyanate-reactive groups containing as an essential component certain compounds containing ammonium carbamate groups.

BACKGROUND OF THE INVENTION

The production of microcellular or foamed moldings having an impervious skin by the isocyanate polyaddition process is known. It is carried out, for example, by introducing a reactive and foamable mixture based on compounds containing reactive hydrogen atoms and polyisocyanates into a mold (cf. for example German Auslegeschrift No. 11 96 864). The compounds containing reactive hydrogen atoms include polyethers containing hydroxyl groups while the polyisocyanates may be selected, for example, from 2,4- and 2,6-tolylene diisocyanate, their isomer mixtures and the polyphenyl/polymethylene polyisocyanate obtained by phosgenating aniline-formaldehyde condensates. The blowing agents used include water and/or fluorinated hydrocarbons or azodiisobutyrodinitrile. Catalysts of the type known in the production of polyurethanes are also generally used.

Assuming the starting components (it is also possible for example to use chain-extending agents, such as glycols or diamines) are suitably selected, it is possible by adopting this procedure to produce elastic products, rigid products, and any intermediate variants. The starting materials used for moldings subjected to severe stressing are generally slightly branched and, after processing, give materials having an elastomer-like property spectrum.

Processing of the starting materials to form bodywork components (e.g., automotive parts) is presently carried out by the so-called reaction injection molding process (RIM process). This process is essentially a filling process in which the highly active, liquid starting components are introduced relatively quickly into the mold through high-output high-pressure metering units after mixing in so-called positively controlled mixing heads.

DE-OS No. 26 22 951 (U.S. Pat. No. 4,218,543) describes how even extremely reactive systems, i.e. one-shot mixtures, of diisocyanates or polyisocyanates (liquid at room temperature) based on 4,4'-diisocyanatodiphenyl methane, active aromatic polyamines, relatively high molecular weight polyhydroxyl compounds containing primary hydroxyl groups and catalysts, with cream times of down to less than one second, can be processed by this method. With systems such as these, the transition from the liquid phase to the solid phase is virtually instantaneous. Although the high reactivity of systems such as these made it possible for the first time for polyurethane and polyurea moldings to be mass-produced with residence times in the mold of less than 1 minute, the known process was nevertheless confined to the production of substantially non-cellular, solid moldings because the blowing agents (fluorinated hydrocarbons or water) normally used in the production of polyurethane-based molded foams develop their blowing effect too slowly. These conventional polyurethane blowing agents proved to be unsuitable for converting highly reactive systems of the above-mentioned type into microcellular moldings having a density reduced by more than 20%. On the other hand, the use of gases, such as nitrogen or air, or of lowboiling liquids involves the problem of exact metering and the difficulty of combining such blowing agents with the reactants for the polyisocyanates to form a storable second component.

On the other hand, there is a need in practice to combine the advantage of an extremely short in-mold residence time of highly reactive systems with the advantage of the reduced weight of the moldings in order to reduce the consumption of material in the production of the moldings and to save weight and, hence, energy (for example where the moldings are used as components in automobile and aircraft construction).

One advantage of the systems described in DE-OS No. 26 22 951 lies in the fact that no external release agent must be used as a separation aid for the release of moldings from geometrically simple panel molds. However, mass production of geometrically complex parts requires the application of release agent at regular intervals. Any fine engraving of the mold gradually becomes covered by residues of release agent. The removal of these firmly adhering residues from the molds, which in many cases are heavily contoured, is only possible with considerable effort. The moldings themselves are covered by a thin film of release agent to which lacquer systems do not adhere. The moldings must be rubbed down before lacquering or washed with solvents to obtain adequate adhesion of the lacquer to the plastic.

The use of the mold release agents known from the Patent Literature which are eminently suitable for the production of self-releasing polyurethane-based foam moldings (cf. for example U.S. Pat. No. 3,726,952, GB-PS No. 1,365,215, U.S. Pat. Nos. 4,033,912, 4,024,090, 4,058,492, DE-OS Nos. 24 27 273, 24 31 968, 23 07 589, 23 19 648 or U.S. Pat. No. 4,076,695), in the reaction mixtures according to DE-OS No. 26 22 951 generally leads at best to a slight improvement in the self-releasing properties of the elastomers produced by the reaction injection molding technique. In addition, the use of release agents containing acid groups, particularly carboxyl groups, in the formulations according to DE-OS No. 26 22 951 is attended by the disadvantage that such release agents interfere with catalysis of the highly reactive systems and by the disadvantage that the moldings obtained have poor green strength.

The production of compounds containing ammonium carbamate groups by reacting primary or secondary aliphatic amines with carbon dioxide is already known. Thus, DE-OS No. 15 70 571, for example, describes the reaction of polyethers containing amino groups with carbon dioxide to form the corresponding ammonium carbamates which may be mixed with epoxide compounds, polyethers or polyesters in the production of foams. There is no reference in this publication to the production of polyurethane or polyurea foams, not to mention the production of polyurea-based moldings.

DE-OS No. 2,132,102 describes the production of polyurethane foams by reacting prepolymers containing NCO-groups with addition products of carbon dioxide and low molecular weight polyamines.

DE-OS No. 22 00 480 describes the production of cellular polyurethanes by reacting polyisocyanates with water. In this process, low molecular weight ammonium carbamates may be used in addition to the water. This publication also has no connection with the production of moldings of the type contemplated herein.

U.S. Pat. No. 3,635,908 is concerned with the production of polyurethanes from (i) polyisocyanates, polyhydroxyl compounds or NCO-prepolymers obtained therefrom and (ii) ammonium carbamates based on low molecular weight polyamines and carbon dioxide. This publication also contains no suggestion of the production of moldings comparable to the products obtained by the process of the present invention.

Accordingly, the object of the present invention is to provide a new process for the production of polyurea-based moldings which is distinguished by the following advantages:

1. the in mold residence times are limited to at most 300 seconds and preferably to at most 180 seconds in the interests of economic mass production;
2. the individual components of the system (which is preferably a two-component system) are mixtures which can be stored at room temperature and transported as such;
3. the process makes it possible to produce microcellular moldings the density of which is at least 10% and preferably between 20 and 40% lower than that of a corresponding, solid molding without any significant deterioration in mechanical properties;
4. The process makes it possible to produce moldings with an improved i.e. more homogeneous surface.

According to the invention, the object as stated above is achieved by the process described herein.

DESCRIPTION OF THE INVENTION

The present invention relates to a process for the production of microcellular or foamed polyurea-based moldings comprising reacting (a) at least one diisocyanate or polyisocyanate containing only aromatically bound isocyanate groups, (b) at least one compound containing at least two isocyanate-reactive groups, and (c) optionally the auxiliaries and additives known in polyurethane chemistry, in closed molds, components (a)–(c) being processed as a one-shot system by reaction injection molding, characterized in that component (b) comprises at least one polyether compound (b1) optionally in admixture with other isocyanate-reactive compounds and containing at least 3 aliphatically bonded ether groups and n-aliphatically bonded isocyanate-reactive groups, n standing for an integer or, statistically a fraction of from 2–4

(i) at least (100:n) % of the isocyanate-reactive groups present in component (b1) being aliphatically bonded primary and/or secondary amino groups, (ii) at least 10 equivalent % of said amino groups being present in the form of ammonium carbamate groups having a functionality of two in the isocyanate addition reaction, of the type obtained by reacting aliphatically bonded, primary or secondary amino groups with carbon dioxide, (iii) the unmodified compounds containing at least 3 ether groups having a molecular weight of from 200 to 10,000 and (iv) at least 0,2 equivalent % of all isocyanate-reactive groups of the total component (b) being ammonium carbamate groups.

The present invention also relates to said compounds (b) optionally in admixture with the auxiliaries and additives known in polyurethane chemistry.

Although it is apparent from the prior publications noted earlier that polyamines containing ammonium carbamate groups give off carbon dioxide and react with isocyanates, particularly at elevated temperatures, it could not have been expected that the polyethers containing ammonium carbamate groups used in accordance with the invention as reaction component (b1) would be suitable for use in achieving the object of the present invention because carbamates (for example the reaction product of hexamethylene diamine with carbon dioxide which is preferably used in the prior art), react too sluggishly to achieve that object in the same way as the conventional blowing agents.

In addition to component (b1) which is essential for the process of the invention the following starting materials are used or may be used in the process of the invention:

(a) A polyisocyanate component consisting of at least one di- or polyisocyanate containing only aromatically bound isocyanate groups;

(b2) optionally at least one compound having a molecular weight of from 400 to 10,000 which is free of ammonium carbamate groups and which contains at least two isocyanate-reactive groups;

(b3) optionally at least one chain lengthening or crosslinking agent which is free of ammonium carbamate groups and which contains at least two isocyanate-reactive groups and which exhibits a molecular weight of from 18 to 400; and (c) optionally auxiliaries and additives known in polyurethane chemistry.

Component (b) comprises components (b1) and optionally components (b2) and (b3).

The auxiliaries resp. additives may be added to component (a) and/or to component (b). Preferably they are added to component (b).

The polyisocyanate component (a) used in the process according to the invention is selected from aromatic diisocyanates and/or polyisocyanates, i.e. those containing only aromatically bound isocyanate groups. Examples of compounds such as these include 2,4- and-/or 2,6-diisocyanatotoluene; 2,2'-, 2,4'- and/or 4,4'-diisocyanato-diphenylmethane, and mixtures of these isomers with their higher homologs, of the type obtained in the phosgenation of aniline/formaldehyde condensates by known methods; urethane-group-containing reaction products of the above-mentioned diisocyanates and/or polyisocyanates with substoichiometric quantities of aliphatic polyhydroxyl compounds having molecular weights in the range from 62 to 700, such as for example ethylene glycol, trimethyl propane, propylene glycol, dipropylene glycol or polypropylene glycols having molecular weights in the above-mentioned range; diisocyanates and/or polyisocyanates modified by conversion of some of the isocyanate groups present into carbodiimide groups; methyl-substituted diisocyanates of the diphenyl methane series or mixtures thereof, as described for example in EP-A-0 024 665; mixtures of the above-mentioned aromatic diisocyanates and polyisocyanates; and the like.

Preferred isocyanates are 4,4'-diisocyanatodiphenylmethane derivatives liquid at room temperature, for example the polyisocyanates containing urethane groups which, according to German Pat. No. 1,618,380 (U.S. Pat. No. 3,644,457), are obtainable by reacting 1 mole of 4,4'-diisocyanatodiphenylmethane with from 0.05 to 0.3 mole of low molecular weight diols or triols (preferably polypropylene glycols having a molecular weight below 700) or carbodiimide-containing and/or urethone-imine-containing diisocyanates based on 4,4'-diisocyanatodiphenylmethane, of the type obtainable for example in accordance with U.S. Pat. Nos. 3,152,162, 3,384,653, 3,449,256, DE-OS No. 2,537,685 or EP-OS No. 5233 (U.S. patent application Ser. No. 903,308). Preferred polyisocyanates also include the corresponding modification products based on mixtures of 2,4'- and 4,4'-diisocyanatodiphenylmethane or even mixtures of the 4,4'-diisocyanatodiphenylmethanes modified as described above with substoichiometric quantities of higher than difunctional polyisocyanates of the diphenylmethane series, for example those of the type described in DE-OS No. 26 24 526. In general, the preferred polyisocyanates used in accordance with the invention are diphehylmethane polyisocyanates which are liquid at room temperature and which have optionally been chemically modified in the manner described, having an average NCO-functionality of 2 to 2.5 and preferably from 2 to 2.2, more particularly about 2, and containing 4,4'-diisocyanato-diphenylmethane as the main component (more than 50% by weight). Mixtures of these diphenylmethane polyisocyanates may also be used.

Component (b1) is a derivative of a polyether having at least 3 aliphatically bound ether groups or of a mixture of such polyethers which polyether resp. mixture of polyethers contains from 2 to 4, preferably from 2 to 3 isocyanate-reactive groups and exhibits a molecular weight calculable from the functionality and content of functional groups of from 200 to 10,000, preferably 400 to 10,000 and most preferably 1,000 to 7,000. In said "derivatives" at least (100:n) equivalent % of the isocyanate-reactive groups are aliphatically bound primary and/or secondary amino groups (n stands for the functionality of the polyether compounds in the isocyanate polyaddition reaction i.e. for an integer or, statistically a fraction of from 2 to 4, preferably 2 to 3). Preferably at least 50% and often from 80 to 100% of all isocyanate-reactive groups of component (b1) consist of such amino groups which, in turn, are at least partially modified as explained hereinafter.

It is the essential point of the invention that the aforesaid amino groups are at least partially modified by reaction with carbon dioxide under formation of ammonium carbamate groups which are difunctional in the isocyanate addition reaction. Thus at least 10, preferably at least 20 and most preferably at least 50 equivalent % of said amino groups of component (b1) are not present as free amino groups but in form of such ammonium carbamate groups. In addition to said ammonium carbamate groups and said amino groups component (b1) may still contain primary or secondary, aliphatically bound hydroxyl groups.

Particularly preferred components (b1) are polyethers or mixtures of polyethers in which (i) from 0 to 50 equivalent percent and preferably from 0 to 30 equivalent percent of the isocyanate-reactive groups consist of primary or secondary, aliphatically bound hydroxyl groups, (ii) from 0 to 90 equivalent percent and preferably from 5 to 80 equivalent percent of the isocyanate-reactive groups consist of primary or secondary, aliphatically or aromatically bound, and preferably aliphatically bound amino groups and (iii) from 10 to 100 equivalent percent and preferably from 20 to 95 equivalent percent of the isocyanate-reactive groups consist of ammonium carbamate groups having a functionality of 2 in the isocyanate polyaddition reaction, of the type formed by reacting aliphatically bound, primary or secondary amino groups with carbon dioxide, the percentages of the individual components (i)–(iii) adding up to 100. In the above context, "primary" and "secondary" hydroxyl groups are understood to be alcoholic hydroxyl groups attached to primary or secondary carbon atoms, while the descriptions "primary" and "secondary" of the amino groups apply to the amino groups themselves and not to the carbon atom attached to the amine nitrogen. Primary amino groups are preferred to the secondary amino groups.

Component (b1) according to the invention may be obtained by suitably modifying the polyhydroxy polyethers known from polyurethane chemistry. In the present context, the "modification" of polyhydroxy polyethers is understood to be the their at least partial conversion into "aminopolyethers" and the subsequent, at least partial reaction thereof with carbon dioxide to form polyethers containing ammonium carbamate groups. The production of the "aminopolyethers", i.e. the partial conversion of the hydroxyl groups in the polyhydroxy polyethers into (preferably primary) amino groups either by replacement of the hydroxyl groups by amino groups or by reaction of the hydroxyl groups with reactants containing amino groups or groups convertible into amino groups, is carried out in known manner. For example, polyhydroxyl polyethers, such as polypropylene glycol ethers may be aminated by reaction with ammonia in the presence of Raney nickel and hydrogen (Belgian Pat. No. 634,741). U.S. Pat. No. 3,654,370 describes the production of polyoxyalkylene polyamines by reacting the corresponding polyol with ammonia and hydrogen in the presence of a nickel, copper or chromium catalyst. German Pat. No. 1,193,671 describes the production of polyethers containing terminal amino groups by the hydrogenation of cyanoethylated polyoxypropylene ethers. Other methods for the production of polyoxyalkylene (polyether) amines are described in U.S. Pat. Nos. 3,155,728 and 3,236,895 and in French Pat. No. 1,551,065. The production of polyethers containing secondary terminal amino groups is described for example in French Pat. No. 1,466,707.

Relatively high molecular weight polyhydroxy polyethers may be converted by reaction with isatoic acid anhydride into the corresponding anthranilic acid esters, as described for example in German Offenlegungsschriften 20 19 432 and 26 19 840 and in U.S. Pat. Nos. 3,808,250; 3,975,428 and 4,016,143. Polyethers containing terminal aromatic amino groups are obtained in this way.

According to German Offenlegungsschrift 25 46 536 and U.S. Pat. No. 3,865,791, relatively high molecular weight compounds containing terminal amino groups can be obtained by reacting NCO-prepolymers based on polyhydroxy polyethers with enamines, aldimines or ketimines containing hydroxy groups, followed by hydrolysis.

According to German Offenlegungsschrift 29 48 419, aminopolyethers can be obtained by the hydrolysis of compounds containing terminal isocyanate groups. In this process, polyethers preferably containing 2 or 3 hydroxyl groups are reacted with polyisocyanates to form NCO-prepolymers and, in a second step, the isocyanate groups is converted by hydrolysis into an amino group.

As already mentioned, "aminopolyethers" containing aliphatically or aromatically bound amino groups may be obtained by a variety of different methods of partial modification. However, aminopolyethers containing only aliphatically bound amino groups are used for further modification by reaction with carbon dioxide. Polyethers containing aromatically bound amino groups may, however, be used as component (b2) resp. as a part of component (b2). Ammonium carbamate groups are introduced by reacting the polyethers containing aliphatically bound primary and/or secondary amino groups with carbon dioxide under pressure or even in the absence of pressure, 2 moles of amino groups reacting per mole of carbon dioxide (cf. for example Journal of the American Chemical Society 73, 1829 (1951)). Accordingly 2 amino groups are formed from 1 mole of ammonium carbamate groups after elimination of the reversibly added carbon dioxide so that, in all stoichiometric calculations, the ammonium carbamate groups may be counted as difunctional groups in the context of the isocyanate addition reaction.

Component (b1) may either consist of polyethers containing only ammonium carbamate groups (i.e. polyhydroxy polyethers completely modified in accordance with the foregoing), or of incompletely modified polyhydroxy polyethers which contain amino and/or hydroxyl groups in addition to the ammonium carbamate groups. Component (b1) generally has an average functionality in the context of the isocyanate addition reaction of from 2 to 4 and preferably from 2 to 3, calculation of the functionality of the polyethers containing ammonium carbamate groups including the functionality of the amino polyethers on which they are based. This also explains why the ionic "chain extension" which is attributable to the formation of ammonium carbamate groups in the reaction of aminopolyethers with carbon dioxide is disregarded in all considerations regarding the molecular weight of component (b1).

Component (b2) which may optionally be used in combination with component (b1) consists either of polyester polyols known in polyurethane chemistry having a molecular weight which may be determined osmometrically of from 400 to 10,000, preferably 1,000 to 10,000 and most preferably 2,000 to 6,000 or, preferably, of polyether polyols having a molecular weight calculable from the content of functional groups and the functionality of from 400 to 10,000, preferably 1,000 to 10,000 and most preferably 2,000 to 6,000 or of mixtures of such polyols having an average molecular weight within said ranges.

Suitable polyester polyols are the well-known reaction products of low molecular weight polyols such as e.g. ethylene glycol, 1,2-dihydroxy-propane, 1,3-dihydroxy-propane, 1,2-dihydroxy-butane, 1,4-dihydroxy-butane, 1,6-dihydroxy-hexane, neopentylglycol, glycerol and/or trimethylol propane with subequivalent amounts of at least bivalent acids resp. anhydrides of acids such as adipic acid, phthalic acid or hexahydrophthalic acid.

Suitable polyether polyols are the well-known polyether polyols of polyurethane chemistry i.e. in principle the same compounds as those which are used for the manufacture of component (b1) with the only exception that the minimum molecular weight of the polyether polyols which may be used as component (b2) is 400. Suitable polyether polyols are especially the alkoxylation i.e. ethoxylation and/or propoxylation products of low molecular weight starters such as water or the polyols mentioned hereinbefore as component for the manufacture of the polyester polyols. It is also possible to use polyester and/or polyether compounds whose hydroxyl groups have been converted at least partially into amino groups in accordance with one of the methods mentioned hereinbefore. It is, however, preferred to use the above mentioned polyhydroxyl compounds resp. their mixtures as component (b2). Component (b2) exhibits generally an (average) functionality of from 2 to 4, preferably of from 2 to 3.

Component (b3) which may also be present as a part of component (b) is selected from compounds or mixtures of compounds having a molecular weight of from 18 to 400 and containing at least 2 isocyanate-reactive groups. These compounds or mixtures of compounds are preferably selected from the group comprising (i) aromatic diamines having molecular weights in the range from 108 to 400, (ii) aminoalcohols (optionally containing ether groups) and having molecular weights in the range from 61 to 400, (iii) aliphatic polyamines having molecular weights in the range from 60 to 400 and (iv) polyhydric alcohols having molecular weights in the range from 62 to 400.

Suitable aromatic diamines (i) include any aromatic compounds having a molecular weight in the above-mentioned range and containing 2 primary and/or secondary aromatically bound amino groups. Preferred aromatic diamines (i) are those which contain an alkyl substituent in at least one ortho-position to the amino groups and, more particularly, those which contain at least one alkyl substituent in the orthoposition to the first amino group and 2 alkyl substituents each containing from 1 to 3 carbon atoms in the ortho-position to the second amino group, and more preferably those which contain an ethyl, n-propyl and/or isopropyl substituent in at least one ortho-position to the amino groups and optionally methyl substituents in the other ortho-positions to the amino groups.

Examples of suitable and preferred diamines include 2,4- and/or 2,6-diaminotoluene, 4,4'-diaminodiphenylmethane, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diamonobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane or 3,5-diethyl-3', 5'-diisopropyl-4,4'-diaminodiphenylmethane.

The aromatic diamines mentioned above may of course also be used in admixture. In this connection, particularly preferred are 1-methyl-3,5-diethyl-2,4-diaminobenzene and a mixture thereof with 1-methyl-3,5-diethyl-2,6-diaminobenzene.

Suitable aminoalcohols (ii) include aminoethanol, aminopropanol, diethanolamine, triethanolamine, or even low molecular weight alkoxylation products of aminic starter molecules containing at least 2 N-H bonds, such as for example the ethoxylation or propoxylation products—optionally containing ether bridges - of ammonia, ethylene diamine or hexamethylene diamine.

Suitable aliphatic amines (iii) include in particular, aliphatic diamines containing primary amino groups, such as for example ethylene diamine, 1,3-diaminopropane, hexamethylene diamine or 1,2-diaminopropane.

Suitable low molecular weight polyhydric alcohols (iv) include ethylene glycol, 1,2-and 1,3-dihydroxypropane, 1,4-dihydroxybutane, 1,6-dihydroxyhexane, trimethylol propane, glycerol, pentaerythritol or even low molecular weight polyols containing ether groups, such as diethylene glycol, triethylene glycol or dipropylene glycol.

The aromatic diamines (i) mentioned by way of example, optionally in admixture with alcohols of the type mentioned by way of example under (iv), more particularly in admixture with ethylene glycol or 1,4-butane diol, are the preferred chain-extending agents according to the present invention.

Component (b3) is generally used in the process according to the invention in quantities corresponding to a ratio by weight of (b1+b2):b3 of from 1:1 to 20:1, preferably from 1.5:1 to 10:1 and, most preferably, from 2.5:1 to 8:1. Furthermore, starting materials (b1) through (b3) resp. their amounts are selected so that at least 0,2, preferably from 2 to 50 and most preferably from 10 to 40 equivalent percent of the isocyanate-reactive groups of component (b) represent ammonium carbamate groups.

Auxiliaries and additives (c) suitable for use in accordance with the invention include, for example, the so-called internal release agents known in the prior art. It is preferred to use internal mold release agents, of the type described for example in DE-OS No. 19 53 637 (=U.S. Pat. No. 3,726,952), DE-OS No. 21 21 670 (=British Pat. No. 1,365,215), DE-OS No. 2,431,968 (=U.S. Pat. No. 4,098,731) and in DE-OS No. 24 04 310 (=U.S. Pat. No. 4,058,492). Preferred release agents included (i) the salts—containing at least 25 aliphatic carbon atoms—of fatty acids containing at least 12 aliphatic C-atoms and primary mono-, di- or polyamines containing 2 and more carbon atoms or amide- or ester-group-containing amines which contain at least one primary, secondary or tertiary amino group, (ii) esters of monofunctional and/or polyfunctional carboxylic acids and polyfunctional alcohols containing saturated and/or unsaturated COOH- and/or OH-groups and having hydroxyl or acid numbers of at least 5, (iii) ester-like reaction products of ricinoleic acid and long-chain fatty acids, polyricinoleic acids, salts of carboxylic acids and tertiary amines, and (iv) natural and/or synthetic oils, fats or waxes.

Particularly preferred are the oleic acid or tall oil fatty acid salts of the amide-group-containing amines obtained by reacting N-dimethylaminopropylamine with oleic acid or with tall oil fatty acid.

In addition to these preferred release agents, it is also possible to use other conventional release agents known either on their own or in admixture with the preferred release agents. These other suitable release agents include, for example, the reaction products of fatty acid esters and polyisocyanates according to DE-OS No. 23 19 648; the reaction products of polysiloxanes containing reactive hydrogen atoms with mono- and/or polyisocyanates according to DE-OS No. 23 56 692 (=U.S. Pat. No. 4,033,912); esters of polysiloxanes containing hydroxymethyl groups with mono- and/or polycarboxylic acids according to DE-OS No. 23 63 452 (=U.S. Pat. No. 4,024,090); and salts of amino-group-containing polysiloxanes and fatty acids according to DE-OS No. 24 27 273 or DE-OS No. 24 31 968 (U.S. Pat. No. 4,098,731).

The above-mentioned internal mold release agents are used—if at all—in a total quantity of from 0.1 to 25% by weight and preferably in a total quantity of from 1 to 10% by weight, based on the reaction mixture as a whole.

In the production of the moldings from components (a) and (b), particularly where high reactive components (b1) and (b3) free from hydroxyl groups are used and, in addition, where the preferred mold release agents are used, no catalysts are required for the reaction between the isocyanate groups and the isocyanate-reactive groups of components (b). The catalysts known for the production of polyurethane foams and microcellular elastomers may be used as further auxiliaries or additives (c).

Suitable catalysts include tertiary amines, such as, for example, triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl imidazole-$\beta$-phenylethylamine, 1,2-dimethyl imidazole and 2-methyl imidazole.

Organometallic catalysts, particularly organotin catalysts, such as for example tin-(II)-salts of carboxylic acids, such as tin-(II)-acetate, tin-(II)-octoate, tin-(II)-ethylhexoate and tin-(II)-laurate and the dialkyl tin salts of carboxylic acids, such as for example dibutyl tin diacetate, dibutyl tin dilaurate, dibutyl tin maleate or dioctyl tin diacetate, may also be used either individually or in combination with the tertiary amines. Further representatives of catalysts and information on the way in which they work can be found in Kunststoff-Handbuch, Vol. VII, by Vieweg & Hochtlen, Carl-Hanser-Verlag, Munich, 1966, for example on pages 96 to 102.

The catalysts are used—if at all—in a quantity of from about 0.001 to 10% by weight and preferably in a quantity of from 0.05 to 1% by weight, based on component (b).

Blowing agents may additionally be used as part of component (c) in the process according to the invention.

Thus, water (which, at the same time, could also partly perform the function of component (b3)) and/or readily volatile organic substances and/or dissolved inert gases may be used as blowing agents.

Examples of organic blowing agents include acetone, ethyl acetate, methanol, ethanol, halogensubstituted alkanes, such as methylene chloride, chloroform, ethylidene chloride, vinylidene chloride, monofluorotrichloromethane, chlorodifluoromethane, dichlorodifluoromethane, butane, hexane, heptane or diethyl ether.

Suitable inert gases include, for example, nitrogen or air.

An additional blowing effect can also be obtained by the addition of compounds which decompose at temperatures above room temperature, giving off gases such as nitrogen, (for example azo compounds such as azoisobutyronitrile). Other examples of blowing agents and information on the use of blowing agents can be found in Kunststoff-Handbuch, Vol. VII, by Vieweg & Hochtlen, Carl-Hanser-Verlag, Munich, 1966, for example on pages 108 and 109, 453 to 455 and 507 to 510. However, the process according to the invention is preferably carried out in the absence of the conventional polyurethane foam blowing agents.

According to the invention, it is also possible to use surface-active additives (emulsifiers and foam stabilizers) as another part of component (c). Suitable emulsifiers include, for example, the sodium salts of castor oil sulfonates or even of fatty acids or salts of fatty acids with amines, such as diethylamine oleate or diethanolamine stearate. Alkali or ammonium salts of sulfonic acids, for example, dodecyl benzene sulfonic acid or dinaphthyl methane disulfonic acid, or even of fatty acids, such as ricinoleic acid, or of polymeric fatty acids may also be used as surface-active additives.

Suitable foam stabilizers are preferably, water-soluble polyether siloxanes. In general, the structure of these compounds is such that a copolymer of ethylene oxide and propylene oxide is attached to a polydimethyl siloxane residue. Foam stabilizers such as these are described, for example, in U.S. Pat. No. 2,764,565.

Other auxiliaries and additives which may optionally be used in the process according to the invention include cell regulators, such as for example paraffins or fatty alcohols or dimethyl polysiloxanes; pigments or dyes and flameproofing agents, such as, tris-chloroethyl phosphate or ammonium phosphate and polyphosphate; stabilizers against the effects of ageing and weathering; plasticizers; fungistatic and bacteriostatic agents; and fillers, such as barium sulfate, glass fibers, kieselguhr or whiting. Glass fibers are particularly preferred fillers.

Further examples of surface-active additives, foam stabilizers, flameproofing agents, plasticizers, dyes and fillers, fungistatic and bacteriostatic agents which may optionally be used in accordance with the invention and information on the way in which these additives are used and on the way in which they work can be found in Kunststoff-Handbuch, Vol. VII, by Vieweg and Hochtlen, Carl-Hanser-Verlag, Munich 1966, for example on pages 103 to 113.

In the application of the process according to the invention, the quantity in which component (a) (polyisocyanate component) is used is preferably gauged in such a way that the foamable mixture has an isocyanate index of from 70 to 130 and more preferably from 90 to 110. The isocyanate index is understood to be the quotient of the number of isocyanate groups and the number of isocyanate-reactive groups multiplied by 100. Calculation of the isocyanate index does not include the isocyanate-reactive groups which may be present in any release agents used. The ammonium carbamate groups are included in the calculation of the isocyanate index as difunctional groups.

The process according to the invention is carried out on the known principle of reaction injection molding (RIM process). Two reaction streams are generally used in this process, the polyisocyanate component (a) being one stream and the components (b), the second stream. The components (c) optionally used are generally added to the active hydrogen containing stream, although it can also be of advantage (for example where release agents containing isocyanate groups are used) to incorporate them in the polyisocyanate component a) before the process according to the invention is carried out. It is of course also possible to use mixing heads of the type which enable 3 or 4 separate streams to be used, so that the individual components do not have to be premixed.

The quantity in which the mixture (which may be foamable) is introduced into the mold is such that the moldings have a density of from 0.2 to 1.4 g/cc and preferably in the range from 0.6 to 1.1 g/cc. The moldings obtained may have a density above 1.0 g/cc, particularly in cases where mineral fillers are used. The moldings which generally have a homogeneous, substantially fault-free surface may be removed from their molds after a residence time therein of from 20 to 300 seconds and preferably from 60 to 240 seconds.

The starting temperature of the mixture introduced into the mold is generally in the range from 10° to 60° C. and preferably in the range from 20° to 50° C. The mold temperature is generally in the range from 40° to 100° C. and preferably in the range from 50° to 70° C.

The moldings obtainable by the process according to the invention are particularly suitable for the production of flexible bodywork components.

It is possible by suitably varying the starting components (a) to (c) and, in particular, by keeping the percentage of component (b3) relatively low, to obtain flexible shoe soles having a high resistance to wear coupled with excellent mechanical strength. Similarly, if the starting components and the quantitative ratios between them are suitably selected, the process according to the invention may also be used for the production of rigid microcellular moldings having densities in the above-mentioned range.

Polyurethane foam moldings obtainable according to the well-known processes of the art using organic blowing agents such as e.g. trichlor-fluor-methane often exhibit marks which correspond to the level of liquid reaction mixture which is filled into the molds which marks are due to the fact that the foamable reaction mixture does not immediately react after filling of the mold. Furthermore due to the fact that the starting materials often exhibit only a limited compatibility with each other foam moldings often exhibit streaks at the surface which are due to said limited compatibility. Surprisingly both these phenomena are not observed when the starting materials containing ammonium carbamate groups which are essential to the process of the invention are used as a part of the component containing isocyanate-reactive groups.

The invention is further illustrated, but is not intended to be limited by the following examples in which all parts and percentages are by weight unless otherwise specified.

EXAMPLES

The formulations described in the following Examples were processed by reaction injection molding (RIM).

The polyisocyanate component and the co-component containing all the other constituents were delivered to a high-pressure metering unit and, after intensive mixing in a positively controlled mixing head, were rapidly introduced under pressure into a metal mold heated to 60° C.

The molds were aluminum boxes having the dimensions: 4×120×400 mm (examples 1-6) resp. 10×200×200 mm (examples 7-13). The molds of examples 3-13 were sprayed with a commercial mold release agent (Acmosil ® of Acmas, Chem. Fabrik Tietzen and Co., Bremen, Germany).

EXAMPLE 1

An aminopolyether (aminopolyether A) having an average molecular weight of 2000 which has been obtained by reacting a propylene oxide/propylene glycol adduct with ammonia in the presence of Raney nickel and hydrogen and with more than 99 equivalent percent of its isocyanate-reactive terminal groups consisting of primary amino groups and less than 1 equivalent percent of secondary hydroxyl groups, is modified by reaction with carbon dioxide in such a way that 53 equivalent percent of the isocyanate-reactive groups consist of ammonium carbamate groups.

55 parts by weight of the polyether thus modified are combined with 18.3 parts by weight of a polyether having an OH-number of 28 (which was obtained by the addition of propylene oxide and then ethylene oxide onto trimethylol propane), 22 parts by weight of a mixture of 65 parts by weight of 1-methyl-3,5-diethyl-2,4-phenylene diamine and 35 parts of 1-methyl-3,5-diethyl-2,6-phenylene diamine, 0.14 part by weight of dibutyl tin dilaurate, 0.1 part by weight of 1,4-diazabicyclo-(2,2,2)-octane and 4.5 parts by weight of the stoichiometric tall oil fatty acid salt of 1 mole of tall oil fatty acid and 1 mole of the aminodamine produced from 1 mole of 3-dimethylamino-1-propylamine and 1 mole of tall oil fatty acid, to form a "polyamine component". 40 parts by weight of ground glass fibers having an average length of 0.2 mm were then added. The mixture was then processed by RIM with 60.5 parts by weight of a reaction product of tripropylene glycol and 4,4'-diphenylmethane diisocyanate (23% by weight NCO). NCO index: 106.

The temperature of the starting materials is 40° C. The in-mold residnece time is a 1 minute.

The polyurea molding has a gross density (DIN 534 20) of 1070 kg/m³. The characteristic data was:

| Tensile strength (DIN 53504) | 28 MPA |
| Breaking elongation (DIN 53504) | 285% |
| Tear propagation resistance with cut (DIN 53515) | 84 kN/m |
| Shore D (DIN 53505) | 56 |
| G'-modulus (DIN 53445) −30° C. | 551 MPa |
| +20° C. | 210 MPa |
| +65° C. | 111 MPa |
| Modulus in flexure (ASTM-D 790-71) | 877 MPa |

EXAMPLE 2

The procedure is as in Example 1, except that the quantity of reaction mixture indtroduced into the mold is such that the molding had a gross density of only 870 kg/m³. Other characteristic data of the molding obtained were:

| Tensile strength (DIN 53504) | 23 MPa |
| Breaking elongation (DIN 53504) | 270% |
| Tear propagation resistance with cut (DIN 53515) | 59 kN/m |
| Shore D (DIN 53505) | 48 |
| G'-modulus (DIN 53445) −30° C. | 359 MPa |
| + 20° C. | 133 MPa |
| + 65° C. | 72 MPa |
| Modulus in flexure (ASTM-D 790-71) | 626 MPa |

EXAMPLE 3

(Comparison example)

77 parts by weight of the polyether polyol having an OH-number of 28 of Example 1, 23 parts by weight of the diamine mixture of Example 1, 0,15 parts by weight of dibutyl tin dilaurate were admixed to form a "polyol component". The polyol component was then processed by RIM with 57 parts by weight of a polyisocyanate component containing 24,5% by weight of isocyanate groups which was prepared by reacting 4,4'-diphenylmethane diisocyanate with a polypropylene glycol having the OH-number 480. The temperature of the raw materials was 40° C. The inmold residence time was 2 minutes. The resulting molding had the following mechanical properties:

| Gross density (DIN 53420) | 1110 kg/m³ |
| Tensile strength (DIN 53504) | 20 MPa |
| Elongation at break (DIN 53504) | 220% |
| Shore D (DIN 53505) | 65 |

EXAMPLE 4

Aminopolyether A was modified with carbon dioxide so that 77 equivalent percent of its isocyanate-reactive groups consisted of ammonium carbamate groups. 10 parts by weight of the modified amino polyether A and 67 parts by weight of the polyether polyol (OH-number=28) of Example 1 were used in the process of Example 3 instead of the above-mentioned 77 parts by weight of said polyether polyol. The remaining reactants and reaction conditions were as set forth in Example 3. The resulting molding had following mechanical properties:

| Gross density (DIN 53420) | 1040 kg/m³ |
| Tensile strength (DIN 53504) | 21 MPa |
| Elongation at break (DIN 53504) | 185% |
| Modulus in flexure (ASTM-D 790-71) | 360 MPa |
| Shore D (DIN 53505) | 60 |

EXAMPLE 5

20 parts by weight of modified aminopolyether A of Example 4, 75 parts by weight of the polyether polyol (OH-number=28) of Example 1, 23 parts by weight of the diamine mixture of Example 1, 0,15 parts by weight of dibutyl tin dilaurate were admixed and processed by RIM with 75 parts by weight of the polyisocyanate component of Example 3. The reaction conditions were as set forth in Example 3. The resulting molding had the following properties:

| Gross density (DIN 53420) | 760 kg/m³ |
| Tensile strength (DIN 53504) | 12,3 MPa |
| Elongation at break (DIN 53504) | 160% |
| Modulus in flexure (ASTM-D 790-71) | 240 MPa |
| Shore D (DIN 53505) | 49 |

EXAMPLE 6

30 parts by weight of the modified aminopolyether A of Example 4, 47 parts by weight of the polyether polyol (OH-number=28) of Example 1, 23 parts by weight of the diamine mixture of Example 1, 0,15 parts by weight of dibutyl tin dilaurate were admixed and processed by RIM with 57 parts by weight of the polyisocyanate component of Example 3. The reaction conditions were as set forth in Example 3. The resulting molding had the following mechanical properties:

| Gross density (DIN 53420) | 580 kg/m³ |
| Tensile strength (DIN 53504) | 7,1 MPa |

| | |
|---|---|
| Elongation at break (DIN 53504) | 110% |
| Modulus in flexure (ASTM-D 790-71) | 180 MPa |
| Shore D (DIN 53505) | 40 |

Examples 3 and 4 show that the modulus in flexure can be increased by slight foaming of the reaction mixture. Examples 5 and 6 show that it is possible to substantially reduce the density of the moldings by replacing a part of the polyether polyol of Example 3 of a modified aminopolyether in accordance with the invention.

EXAMPLE 7

40 parts by weight of the modified aminopolyether A of Example 4, 50 parts by weight of the propopxylation product of ethylene diamine (OH-number=790), 10 parts by weight of the diamine mixture of Example 1 and 6 parts by weight of the tall oil fatty acid salt of Example 1 were admixed and processed by RIM with 145 parts by weight of the polyisocyanate component of Example 3. The temperature of the reactants before the mixing step was 40° C. The in-mold residence time was 3 minutes. The resulting molding had the following properties:

| | |
|---|---|
| Gross density (DIN 53420) | 840 kg/m$^3$ |
| Modulus in flexure (ASTM-D 790-71) | 1400 MPa |
| Shore D (DIN 53505) | 77 |
| Impact strength (DIN 54432) | 18 kJ/m$^2$ |

EXAMPLE 8

Example 7 was repeated with the only exception that the amount of the foamable reaction mixture was selected so that a molding having a gross density of 590 kg/m$^3$ results. The molding exhibits the following properties:

| | |
|---|---|
| Modulus in flexure (ASTM-D 790-71) | 880 MPa |
| Shore D (DIN 53505) | 65 |
| Impact strength (DIN 53432) | 11 kJ/m$^2$ |

EXAMPLE 9

(Comparison)

95 parts by weight of the polyether polyol (OH-number=28) of Example 1, 5 parts by weight of ethylene glycol, 0,4 parts by weight of water, 0,35 parts by weight of diethylene triamine, 0,5 parts by weight of tetramethyl-ethylene-diamine, 6 parts by weight of trichlorofluoromethane were admixed and processed by RIM with 28 parts by weight of a polyisocyanate mixture consisting of 10% by weight of 2,4'-diisocyanato-diphenyl methane, 75% by weight of 4,4'-diisocyanato-diphenyl methane and 15% by weight of higher functional polyisocyanates of the diphenyl methane series.

The temperature of the reactants was 40° C. The in-mold residence time was 3 minutes. The resulting foam with an integral skin exhibits the following properties:

| | |
|---|---|
| Gross density (DIN 53420) | 130 kg/m$^3$ |
| Tensile strength (DIN 53571) | 160 kPa |
| Elongation at break (DIN 53571) | 120% |
| Compression hardness (DIN 53577) | 16 kPa |

The integral skin of the molding shows clearly visible streaks, furthermore, a mark which corresponds to the level of the foamable liquid in the mold prior to foaming.

EXAMPLE 10

Example 9 was repeated with the only exception that 10 parts by weight of said polyether polyol (OH-number =28) were replaced with 10 parts by weight of the modified aminopolyether of Example 4.

The resulting molding exhibits a completely homogenous surface and substantially the same mechanical properties as the molding of Example 9.

EXAMPLE 11

2 parts by weight of the modified aminopolyether of Example 4, 9 parts by weight of a polyester polyol (OH-number=56) obtained by esterification of adipic acid with a mixture of ethylene glycol with 1,4-dihydroxybutane (weight ratio=1:1), 15 parts by weight of 1,4-dihydroxy-butane, 0,4 parts by weight of water, 0,5 parts by weight of triethylene diamine are admixed and processed by RIM with 94 parts by weight of a NCO-prepolymer (NCO-content =19% by weight) obtained from 4,4'-diisocyanato-diphenylmethane and above polyester diol.

The temperature of the reactants was 40° C. The in-mold residence time was 3 minutes.

Mechanical properties:

| | |
|---|---|
| Gross density (DIN 53420) | 560 kg/m$^3$ |
| Shore A (DIN 53505) | 62 |
| Tensile strength (DIN 53504) | 10 MPa |
| Elongation at break (DIN 53504) | 480% |
| Tear propagation resistance (DIN 53507) | 15 kN/m |

EXAMPLE 12

10 parts by weight of the modified aminopolyether of Example 4, 80 parts by weight of a polyether diol (OH-number=28), obtained by propoxylation of propylene glycol with subsequent ethoxylation of the propoxylation product (weight ratio PO:EO=85:15), 20 parts by weight of the polyether polyol (OH-number=28) of Example 1, 9 parts by weight of the diamine mixture of Example 1, 0,2 parts by weight of triethylene diamine, 0,15 parts by weight of dibutyl tin dilaurate, 10 parts by weight of trichloro-fluoromethane were admixed and processed by RIM with 40 parts by weight of a NCO-prepolymer (NCO-content=23% by weight) obtained by reacting 4,4'-diisocyanato-diphenylmethane with tripropylene glycol.

The temperature of the starting materials was 28° C. The in-mold residence time was 2 minutes.

| | |
|---|---|
| Gross density (DIN 53420) | 750 kg/m$^3$ |
| Shore A (DIN 53505) | 64 |
| Tensile strength (DIN 53504) | 6 MPa |
| Elongation at break (DIN 53504) | 400% |
| Tear propagation resistance (DIN 53507) | 10 kN/m |

The addition of the polyether containing ammonium carbamate groups in Examples 11 and 12 leads to a considerable improvement of the quality of the surface of the molding.

EXAMPLE 13

An aminopolyether prepared by propoxylation of trimethyl propane and subsequent reaction of the propoxylation product with ammonia in the presence of Raney-nickel having a molecular weight of 5250, containing more than 99 equivalent % of primary amino groups and less than 1 equivalent % secondary hydroxyl groups as terminal isocyanate-reactive groups is modified with carbondioxide so that 66 equivalent % of the isocyanate-reactive groups consisted of ammonium carbamate groups. 20 parts by weight of the so modified polyether, 57 parts by weight of the polyether polyol (OH-number=28) of Example 1, 23 parts by weight of the diamine mixture of Example 1 and 0,15 parts by weight of dibutyl tin dilaurate are admixed and processed by RIM with 57 parts by weight of the modified polyisocyanate of Example 3.

The temperature of the reactants was 40° C. The in-mold residence time was 2 minutes.

| | |
|---|---|
| Gross density (DIN 53420) | 1050 kg/m$^3$ |
| Tensile strength (DIN 53504) | 23 MPa |
| Elongation at break (DIN 53504) | 200% |
| Modulus in flexure (ASTM-D 790-71) | 370 MPa |
| Shore D (DIN 53505) | 57 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurea-based microcellular moldings comprising reacting
   (a) at least one diisocyantate or polyisocyanate containing only aromatically bound isocyanate groups,
   (b) at least one compound containing at least two isocyanate reactive groups, and
   (c) optionally the auxiliaries and additives known in polyurethane chemistry, in closed molds, components (a)–(c) being processed as a one-shot system by reaction injection molding, characterized in that component (b) comprises at least one polyether compound (b1) optionally in admixture with other isocyanate-reactive coupounds and containing at least 3 aliphatically bonded ether groups and n aliphatically bonded isocyanate-reactive groups, n standing for a number of from 2–4
   (i) at least (100:n) % of the isocyanate-reactive groups present in component (b1) being aliphatically bonded primary and/or secondary amino groups,
   (ii) at least 10 equivalent % of said amino groups being present in the form of ammonium carbamate groups having a functionality of two in the isocyanate addition reaction, obtained by reacting aliphatically bonded, primary or secondary amino groups with carbon dioxide,
   (iii) the unmodified compounds containing at least 3 ether groups having a molecular weight of from 200 to 10,000 and (iv) at least 0.2 equivalent % of all isocyanate-reactive groups of the total component (b) being ammonium carbamate groups.

2. A process as claimed in claim 1, characterized in that the quantity in which the foamable mixture is introduced into the mold is such that moldings having gross densities of from 0.2 to 1.4 g/cc are obtained, the moldings being removed from the mold at most 180 seconds after filling of the mold.

3. A process as claimed in claim 1, characterized in that component (b) further comprises
   (b2) at least one compound of the molecular weight of from 400 to 10,000 which is free of ammonium carbamate groups and which contains at least two isocyanate-reactive groups, and
   (b3) at least one chain lengthening or crosslinking agent having a molecular weight in the range from 18 to 400 which is free of ammonium carbamate groups and which is at least difunctional in the isocyanate addition reaction.

4. A process as claimed in claim 3 characterized in that compounds or mixtures of compounds selected from the group comprising
   (i) diamines containing two primary and/or secondary aromatically bound amino groups and having molecular weights in the range from 108 to 400,
   (ii) aminoalcohols containing at least two isocyanate reactive groups and having molecular weights in the range from 61 to 400,
   (iii) aliphatic polyamines containing at least two primary or secondary amino groups and having molecular weights in the range from 60 to 400 and
   (iv) di- or polyhydric primary or secondary alcohols having molecular weights in the range from 62 to 400, are used as component (b3).

5. A process as claimed in claim 3, characterized in that diprimary aromatic diamines which contain ethyl, n-propyl and/or isopropyl substituents in at least one ortho-position to the amino groups and, optionally, methyl substituents in the other ortho-positions to the amino groups are used as component (b3).

6. A process as claimed in claim 3, characterized in that polyether polyols carrying from 2 to 3 terminal hydroxyl groups are used as component (b2).

7. A process as claimed in claim 3, characterized in that the reactants are used in quantities corresponding to a ratio by weight of (b1+b2):b3 of from 1:1 to 20:1 and to an isocyanate index of from 70 to 130.

8. A process as claimed in claim 1, characterized in that internal mold release agents are included.

9. Polyether compounds optionally in admixture with other isocyanate-reactive compounds and optionally in admixture with the auxiliaries and additives known in polyurethane chemistry containing at least 3 aliphatically bonded ether groups and n aliphatically bonded isocyanate-reactive groups, n standing for a number of from 2–4
   (i) at least (100:n) % of the isocyanate-reactive groups present in component (b1) being aliphatically bonded primary and/or secondary amino groups,
   (ii) at least 10 equivalent % of said amino groups being present in the form of ammonium carbamate groups having a functionality of two in the isocyanate addition reaction, obtained by reacting aliphatically bonded, primary or secondary amino groups with carbon dioxide,
   (iii) the unmodified compounds containing at least 3 ether groups having a molecular weight of from 200 to 10,000 and
   (iv) at least 0.2 equivalent % of all isocyanate-reactive groups of the total composition being ammonium carbamate groups.

* * * * *